United States Patent [19]
Pechorin

[11] Patent Number: 4,748,396
[45] Date of Patent: May 31, 1988

[54] ELECTRIC CELL AND METHOD OF PRODUCING ELECTRICITY

[76] Inventor: Valentin Pechorin, 13 Strawberry Bank Rd., Nashua, N.H. 03062

[21] Appl. No.: 934,941

[22] Filed: Nov. 25, 1986

[51] Int. Cl.⁴ .............................................. H02N 3/00
[52] U.S. Cl. ...................................... 322/2 R; 350/357
[58] Field of Search ...................... 322/2 R; 350/357; 338/32 H

[56] References Cited

U.S. PATENT DOCUMENTS

| | | | |
|---|---|---|---|
| 4,060,311 | 11/1977 | Green | 350/357 |
| 4,115,631 | 9/1978 | Deb | 350/357 X |
| 4,211,475 | 7/1980 | Malugani et al. | 350/357 |
| 4,256,379 | 3/1981 | Green | 350/357 |

Primary Examiner—R. J. Hickey
Attorney, Agent, or Firm—William Nitkin

[57] ABSTRACT

An electric cell having a membrane of fast ion-conducting material each side thereof having different ionic concentrations therein creating ionic movement from the side of higher ion concentration to the side of lower ion concentration, such membrane disposed in a magnetic field generally perpendicular to the direction of such ionic movement creating an electric potential at the side of said membrane perpendicular to the direction of the magnetic field and direction of ionic movement and method of producing electricity with such cell.

1 Claim, 1 Drawing Sheet

ELECTRIC CELL AND METHOD OF PRODUCING ELECTRICITY

BACKGROUND OF THE INVENTION

1. Field of the Invention

The field of this invention resides in the area of electric cells.

2. Description of the Prior Art

Hall's electric cells are well known in the prior art. Such cells have a metal or semiconductor strip with a source of electricity providing a control current to each end thereof causing an electrical potential at the ends of the strip. A magnetic field is provided at a direction generally perpendicular or at least at any angle except 0° to the direction of the control current. Electrons move because of the electric field in the strip in combination with the magnetic field which changes the direction of the movement of such electric charges in accordance with Lorentz'Law. For this reason, an electrical potential difference or Hall voltage is found on the sides of the strip where a current is generated. For example, on a copper strip, an electric field of $1 \times 10^{-5}$ volts/cm can be achieved. When using semiconductors, the electrical potential difference is much greater. Whether an electrical potential difference is positive or negative depends upon the sign of the electrical charges and the direction of the magnetic fields. Hall's electric cells are utilized for precision measurements of magnetic fields and also for judging the number and mobility of electrons or holes in metals or semiconductors per unit volume.

SUMMARY OF THE INVENTION

It is an object of this invention to provide a highly improved variation of a Hall's-type cell utilizing new techniques based on fast ion-conducting materials (FICM) which have been developed from materials such as zirconium oxide, molybdenum oxide, chromium oxide, aluminum oxide or equivalent, for example. Such fast ion-conducting materials have special crystal structures that allow for and provide fast ion transport. For example, such materials can be inorganic materials with high ion conductivity of $LI^+$, $AG^+$, $CU^+$, $K^+$, $NA^+$, $NH_4^+$, $CS^+$ and $O^=$. Also such materials can be organic lipid membranes which have a high ion conductivity of $K^+$ and $NA^+$. It has been found that palladium and silver have high ion conductivity of $H^+$ and $O^=$, respectively. Such fast ion-conducting materials have been found in the metal group, organic and inorganic groups and the ion movement in those materials can be achieved where there is a difference of concentrations of ions in the material due to diffusion from areas of high ion concentration to areas of low ion concentration. Therefore it is an object of this invention to provide a cell with a membrane of fast ion-conducting material with a high concentration of ions on one side and having a lower concentration of ions on its other side so that ion movement from the first side of high concentration to the second side of low concentration is created. If such a membrane is put in a magnetic field perpendicular to the direction of the ion movement or at least at any angle except at 0° to the direction of ion movement, an electric potential difference is found at the sides of the membrane. This potential difference is perpendicular to the direction of the diffusion of ions and the magnetic field. The electric field generated by this cell can be described by the equation:

$$E = JBZ/NE$$

where:
- E=the generated electric field in the membrane
- J=ion current density
- B=magnetic induction
- N=average concentration of ions in the membrane
- Z=ionic valency
- E=elemental charge $1.6 \times 10^{-19}C$ For example, a cell having a couple $\beta$-alumina-$NA^+$ will produce an electric field of $1 \times 10^{-4}$ volts/cm.

The ion current density (J) depends upon differences in the concentration of ions on the sides of the membrane utilized so that the electric cell of this invention can be utilized for the measurement of unknown concentrations of particular components in liquids and gases on one side of the membrane. The device of this invention could also be utilized for low-power electric cells as well as for measurements of magnetic fields. It also can be used to determine ion concentrations in past ion-conducting materials.

DESCRIPTION OF THE PREFERRED EMBODIMENT(S)

Figure 1:
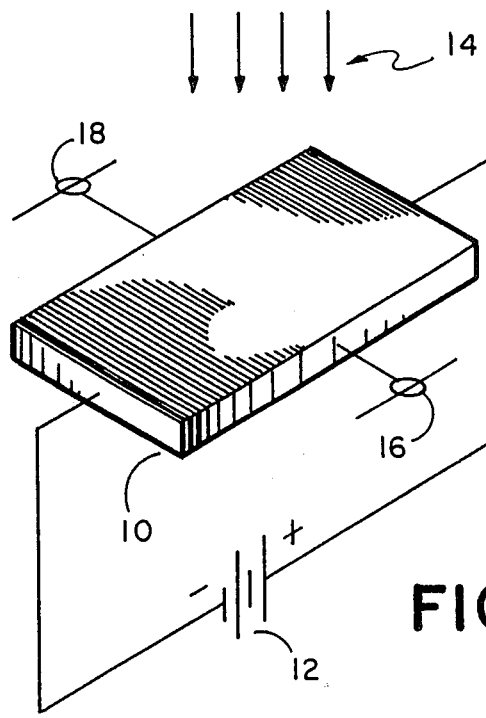
FIG. 1 illustrates a Hall's electric cell of the prior art.

FIG. 1 illustrates a Hall's electric cell of the prior art. Such cells usually are made up of a metal or semi-conductive strip 10 having an electrical source 12 provide an electric potential difference to the ends of strip 10. A magnetic field 14 is provided at a direction perpendicular to or at least at any angle except 0° to the direction of the electric current produced by electric source 12. Magnetic field 14 changes the direction of the movement of the electrical charges in strip 10 in accordance with Lorentz's Law and this interaction creates an electrical potential difference from contacts 16 and 18 extending from the sides of the strip.

Figure 2:
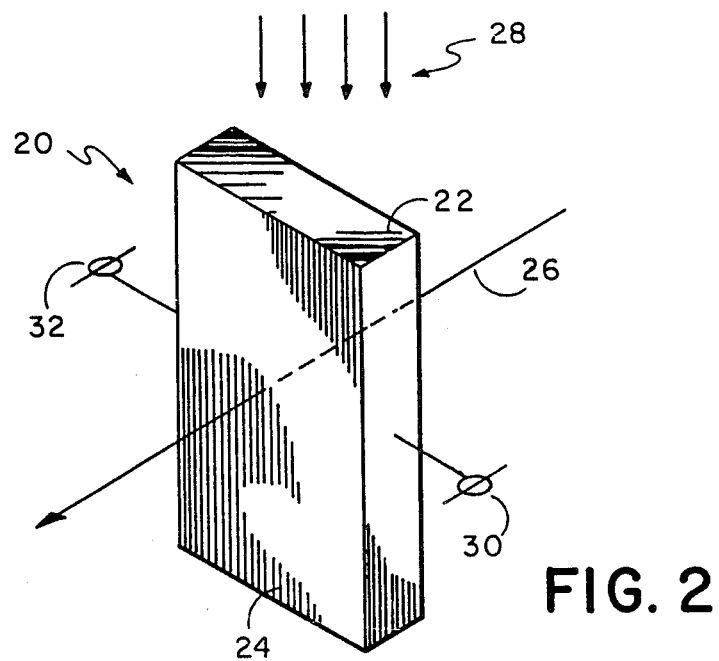
FIG. 2 illustrates the electric cell of this invention.

FIG. 2 illustrates the cell of this invention made of a membrane having a first side 22 and a second side 24, such membrane being made of a fast ion-conducting material which provides for fast ion transport as described above. In the cell illustrated, the ion movement is from side 22 of the membrane having higher ion concentration to the second side 24 of the membrane having lower ion concentration and often in practice having zero concentration and such movement is indicated generally by the direction of arrow 26. When this membrane is put in a magnetic field 28 that is perpendicular to the direction of ion movement or at least at any angle thereto except 0°, an electrical potential difference is found at the sides of the membrane such as from contacts 30 and 32, such positioning being perpendicular to the direction of the diffusion of ions 26 and the direction of the magnetic field 28.

Although the present invention has been described with reference to particular embodiments, it will be apparent to those skilled in the art that variations and modifications can be substituted therefor without departing from the principles and spirit of the invention.

I claim:
1. A method for producing electricity, comprising providing a membrane of fast ion-conducting materials having a first side and a second side, said first side having a higher ion concentration than said second side, such difference in ion concentration creating a diffusion of ions and resulting ion movement from said first side to said second side of said membrane;

placing said membrane in a magnetic field situated at an angle other than 0° to the direction of the ion movement; and providing means to receive current from said cell that is produced at the sides of said membrane perpendicular to the direction of the magnetic field and direction of ion movement.

* * * * *